United States Patent
Lynam et al.

(10) Patent No.: US 9,929,924 B2
(45) Date of Patent: Mar. 27, 2018

(54) SDN CONTROLLER LOGIC-INFERENCE NETWORK TROUBLESHOOTER (SDN-LINT) TOOL

(71) Applicant: Telefonaktiebolaget L M Ericsson (publ), Stockholm (SE)

(72) Inventors: Jonathan Lynam, San Jose, CA (US); Lars Ernstrom, Palo Alto, CA (US); Joel L. Wittenberg, El Cerrito, CA (US); Yakov Teplitsky, Cupertino, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 266 days.

(21) Appl. No.: 14/866,528

(22) Filed: Sep. 25, 2015

(65) Prior Publication Data

US 2017/0093664 A1    Mar. 30, 2017

(51) Int. Cl.
*G06F 15/173* (2006.01)
*H04L 12/26* (2006.01)
*H04L 12/24* (2006.01)

(52) U.S. Cl.
CPC ...... *H04L 43/0823* (2013.01); *H04L 41/0631* (2013.01); *H04L 43/06* (2013.01); *H04L 41/064* (2013.01); *H04L 41/069* (2013.01); *H04L 41/147* (2013.01)

(58) Field of Classification Search
CPC . H04L 43/0823; H04L 43/06; H04L 41/0631; H04L 41/064; H04L 41/069; H04L 41/147
USPC ........................................................ 709/224
See application file for complete search history.

(56) References Cited

U.S. PATENT DOCUMENTS

| | | | |
|---|---|---|---|
| 2009/0113052 A1 | 4/2009 | Doshi et al. | |
| 2012/0005542 A1 | 1/2012 | Petersen et al. | |
| 2017/0013003 A1* | 1/2017 | Samuni | H04L 63/1425 |

FOREIGN PATENT DOCUMENTS

| | | |
|---|---|---|
| EP | 1560366 A1 | 8/2005 |
| WO | 2015040625 A1 | 3/2015 |

* cited by examiner

*Primary Examiner* — Wing F Chan
*Assistant Examiner* — Joseph Maniwang
(74) *Attorney, Agent, or Firm* — Nicholson, De Vos, Webster & Elliot, LLP

(57) ABSTRACT

A method is provided that is implemented by a computing device to automate management functions in a network. The method collects existing state of the network from local database tables, logs or remote system tables. An expected network state is generated from a predefined set of expectations. The expected network state is compared to the collected existing state to identify errors in the network. The method then generates a set of notifications for administrators for the identified errors.

16 Claims, 11 Drawing Sheets

SDN CONTROLLER LOGIC-INFERENCE NETWORK TROUBLESHOOTER (SDN-LINT) TOOL

FIELD

Embodiments of the invention relate to the field of network management and administration, and more specifically, to a process and system for automated diagnosis of network conditions and operation that generate notifications to an administrator when the collected state information about the network does not match with the expected network state defined by an administrator.

BACKGROUND

As long as computer networks have existed there has been a need to perform troubleshooting to determine what is the cause of any network failure to function or to perform as expected. When a phone call (routed across a network) doesn't go through, or data packets are dropped by the network, there are complicated sets of possibilities that have to be considered and systematically ruled out to determine the cause, before the network can be fixed or reconfigured to solve the problem. This process is often time consuming, labor intensive, and requires troubleshooting expertise on multiple types of equipment that are present in the network. The process typically involves aggregating data (e.g., log files) from multiple sources (i.e., multiple types of equipment) into one place, then using text search tools and conventional text editing techniques to look through log files and data about the current and/or prior state of each device.

With the advent of software defined networking (SDN), the problems related to troubleshooting have not improved much. Indeed in many senses the problem is even more difficult. In traditional networks, packet switched networks that do not have a centralized controller, network problems are most commonly the result of human error/misconfiguration, or sometimes faulty equipment. In SDN networks, there is the additional possibility that the source of a problem is a defective program that is operating at the controller.

Since networks are becoming more widespread, powerful, and complex, it is expected that traditional means of network troubleshooting by examining log files and device states manually will eventually become infeasible, due partially to the number and variety of devices involved, virtualization, device heterogeneity and specialization, and that in SDN networks, all network devices can be highly customized by the network operator and are therefore more difficult to characterize than traditional network equipment.

Upon discovery of a network problem, the conventional practice by a network administrator is to determine what devices are involved with the given problem, gather log files and runtime data from each device, save them into one or more files on a computer. Then the administrator will use text search tool in a regular text editor to attempt to locate the source of the problem.

The core problem is that text search is not a very powerful or dynamic tool for finding complex patterns. If a problem can be diagnosed as simply as looking for a warning and/or error messages, and if those messages are understandable to the point that the administrator can amend the network configuration to resolve the issue, then regular text search/editing tools are fine. However, there are several categories of network problems that are not amenable to text search tools.

SUMMARY

A method is implemented by a computing device to automate management functions in a network. The method collects an existing state of the network from local database tables, logs or remote system tables. An expected network state is generated from a predefined set of expectations. The expected network state is compared to the collected existing state to identify errors in the network. The method then generates a set of notifications for administrators for the identified errors.

In another embodiment, a network device in a network including a plurality of network devices is configured to implement a method to automate management functions in a network. The network device includes a non-transitory machine readable medium, having stored therein a logic module and a monitoring module, and a processor coupled to the non-transitory machine readable medium. The processor is configured to execute the logic module and the monitoring module. The logic module is configured to generate an expected network state from a predefined set of expectations. The monitoring module is configured to collect existing state of the network from local database tables, logs or remote system tables, to compare the expected network state to the collected existing state to identify errors in the network, and to generate a set of notifications for administrators for the identified errors.

In a further embodiment, a computing device is in communication with a network device in a network including a plurality of network devices. The computing device is configured to execute a plurality of virtual machines for implementing network function virtualization (NFV), wherein a virtual machine from the plurality of virtual machines is configured to implement a method to automate management functions in a network. The computing device includes a non-transitory machine readable medium, having stored therein a logic module and a monitoring module and a processor coupled to the non-transitory machine readable medium. The processor is configured to execute the virtual machine. The virtual machine is configured to execute the logic module and the monitoring module. The logic module is configured to generate an expected network state from a predefined set of expectations. The monitoring module is configured to collect existing state of the network from local database tables, logs or remote system tables, to compare the expected network state to the collected existing state to identify errors in the network, and to generate a set of notifications for administrators for the identified errors.

In one embodiment, a control plane device is configured to implement a control plane of a software defined network (SDN) network, the SDN network including a plurality of network devices. The control plane device is configured to implement a method to automate management functions in a network. The control plane device includes a non-transitory machine readable medium, having stored therein a logic module and a monitoring module and a processor coupled to the non-transitory machine readable medium. The processor is configured to execute the logic module and the monitoring module. The logic module is configured to generate an expected network state from a predefined set of expectations. The monitoring module is configured to collect existing state of the network from local database tables, logs or remote system tables, to compare the expected network state to the collected existing state to identify errors in the network, and to generate a set of notifications for administrators for the identified errors.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
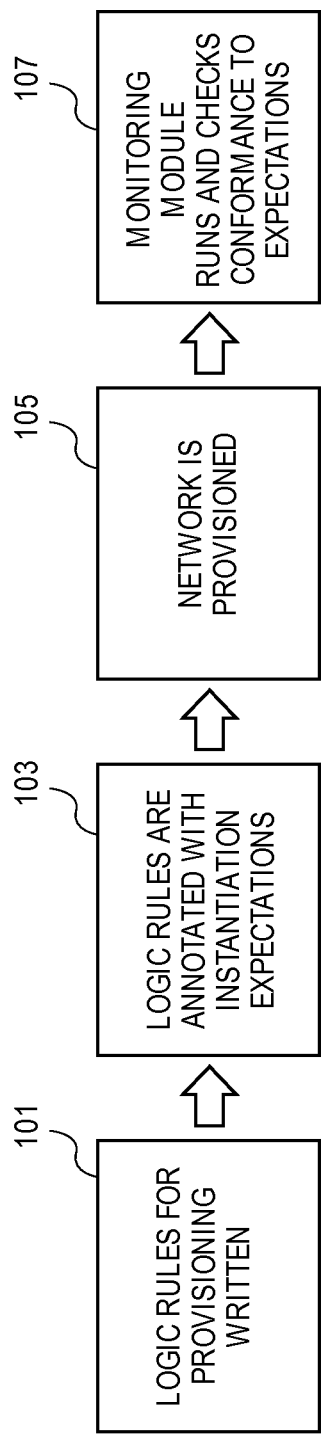
FIG. 1 is a flowchart of one embodiment of the overall process for automating network monitoring.

The following description describes methods and apparatus for network management and administration. The methods and apparatus include a process and system for automated diagnosis of network conditions and operation that generate notifications to an administrator when the collected state information about the network does not match with the expected network state defined by an administrator. The embodiments include a monitoring and troubleshooting environment where logic rules can be used to examine the state of a network controller including the tables of data maintained by the network controller, and method to annotate provisioning rules for the network controller, which can be described as logic rules such that certain types of failures can be automatically determined by a tool which may then bring those failures to the attention of a network administrator. The logic rules can be used across aggregated network configuration and runtime data in order to identify complex problems. The logic rules can be used to identify more complex patterns than text searching.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

The method and system described herein is designed to improve the efficiency in handling various types of network problems, including identifying errors of omission, errors that have complex patterns, errors without clear or consistent patterns and combinations thereof. These types of errors are described in further detail.

Errors of omission: In this case, errors and warnings are not present or available because something didn't occur when/where it should have. This type of error is more difficult to troubleshoot because typically an error or warning message does not explicitly appear in a log message or centralized monitoring system, unless perhaps the protocol or service involved was designed to give up and fail after a prescribed amount of time. Instead, with this type of error something simply doesn't occur that should. Often this type of problem is not noticed until a user reports trouble to the network operator.

Complex patterns. Most searching or filtering techniques available to users, such as network administrators, via program user interfaces (UIs) are limited to exact or pattern matching across a number of record fields. This type of interface is weak for finding problems because the input values (identifiers, addresses, names) must be supplied by humans instead of being inferred by association with other things or events. For example, finding patterns such as "phone numbers that made a call but did not generate a billing record" can't be handled by most generic text searching utilities. Most of the time, a network administrator would have to fall back to writing a custom piece of software to find such an anomaly.

Unknown patterns: Using a text search requires a known pattern to search for. This can be problematic since in many troubleshooting scenarios the network administrator has only a vague idea of what they are looking for. Even if an expected log message is known, the precise text of an event may be unknown, or may contain variables (e.g., identifiers that are randomly assigned) that are unknown and/or can only be determined by examining other log messages.

In addition, the errors can be a mixture of the several types of errors. An example scenario is described herein below that encompasses several types of cases, that amongst other things illustrate that text search alone has shortcomings for trouble shooting.

When text search is insufficient for finding a root cause, often due to the sheer volume of data and lack of specific words to search for, a capable network administrator will often then fall back to writing scripts that can help to analyze the log messages. The workflow for the network administrator to solve the problem would follow the general premise of 1) determine an expected sequence of events for a given network usage event (e.g., a call being placed, a firewall rule being installed, etc.), 2) determine an expected sequence of log or debug messages that should occur in the absence of failure, 3) write a script that will search for these events for every individual network usage event, 4) gather log data, potentially from multiple systems, and 5) run the newly created script on those logs.

There are a number of costs and problems associated with that approach: 1) the development of such scripts is costly and requires some programming expertise on the part of administrators, 2) most such troubleshooting scripts are written for a one-time event and then discarded, 3) formats of log messages may change, making those scripts obsolete, and 4) if the script is written in a regular style in a conventional programming language such as python, bash, or perl, the programmer will not have logic rules immediately available as an implementation mechanism. Because of this, the programmer will have to resort to less powerful techniques of correlating log messages.

An illustrative example of a complex situation involving several of these difficulties with conventional systems could be described as finding "all multi-way calls with at least eight parties where an attempt is made to add a ninth party but the call never completes." Supposing there were a specific set of network policies or software bugs that necessitated such an analysis, for example, to classify that situation as an error, either a series of text searches would have to be performed, or a script would have to be written.

This process would require first identifying calls that have eight parties at some point in time, which may also be hard to do as it may require tracking the state of each call, e.g., it would not be possible to know the number of parties in the call without tracking state unless each log message for a newly joined party also reports the number of existing participant parties. Thus, where the log messages don't include this information the network administrator or the script would have to keep track of how many events of party add/drop have been recorded at a particular point in time. In other words, the human or script would have to keep state with respect to the number of participant parties for every call (since it is not known in advance what call will be searched for), for any given point in time.

A simple text search can't easily detect the absence of a completed call log message, without essentially tracking the state of every call, unless there are specific timeout warning messages to search for (some systems and protocols support this, but many do not). There is not a specific phone number to trace; that data is contingent on tracking the state of calls with multiple parties, so this presents an unknown variable.

If the amount of log message data is very high, and if there are no other identifiers or fixed log message strings relevant to the problem diagnosis, then a skilled network administrator would very likely resort to writing a script to identify such a problem. That script would have to parse log messages, keep state of all calls based on log messages indicating party add/drop to keep a "running count" of parties per call. Then for every such call with eight parties at some point in time, the script would detect if there was an initiation of another party add, again based upon log messages, but then confirm the absence of any log message indicating success of the party add operation. Only when those two situations are achieved does the script actually find the identifier in question, e.g., the phone number of the main call to which this failure to add a party situation occurred.

The embodiments of the invention overcome the deficiencies of the prior art by providing a monitoring and troubleshooting environment where logic rules can be used to examine a state of a network controller. The embodiments also provide a method to annotate a network controllers provisioning rules. This annotation can be in the form of logic rules such that certain types of failures can be automatically determined by application of the logic rules by a tool to bring the logic rule defined failures to the attention of a network administrator. The logic rules can be used across an aggregated network configuration and runtime data in order to identify complex problems. The logic rules can be used to identify more complex patterns than text searching. For example, this system can be used to identify problems that require tracing complex chains of relationships. Also, the embodiments augment the provisioning rules of network controllers in such a way that an automated program referred to herein as a monitoring module can determine whether an action that was expected to occur did not occur. This can be used to provide proactive warning notifications to the network administrator.

In further embodiments, an internal state of a network controller is made accessible for troubleshooting by logic rules. The provisioning rules of the network controller are augmented to give guidance about the expected provisioning actions that should occur, such that an automated program can find some problems without human intervention. Instead of searching log files and examining device state, a network administrator can write proactive monitoring rules as well as do post-facto analysis. The embodiments provide a method for powerful complex pattern matching using logic programming instead of simple text searching.

The embodiments provide advantages over prior art of simple text searching as the use of logic rules can specify complex and recursive patterns that simple text search alone cannot express. In a debugging scenario, the primary advantage of logic rules for troubleshooting is that a larger class of patterns of network problems can be specified, including those involving complex patterns, where some of the variables are unknown. Logic rules are particularly useful for patterns that require recursion and or looping, whereas most text search cannot perform these functions. Text search based upon regular expressions (as found in the 'grep' tool) cannot express recursion generally in normal usage. Typically, recursive, looping or stateful patterns are handled by a script which initiates multiple text searches automatically. Instead, the embodiments allow interactive or automated troubleshooting, by writing logic rules, which fully support recursion.

An example of the need for recursion would be a task to find "any node, which would be unable to reach server X if any single network link were to fail." Since it is unknown the maximum number of links on all relevant shortest paths from X to that node, there is no fixed-length query that can be used. On the contrary, the search must consider paths of any length with no fixed upper bound, which requires the power of general recursion. If the network controller is already built using logic programming or relational schemas, troubleshooting can be automated and incorporated into an online or offline tool. With basic annotations as guidance, the automated monitoring module can find out when outcomes are not as expected. In one embodiment, the monitoring module is insensitive to changes in the literal text of log messages. If the monitoring module is used such that it is integrated into the management of tables of a network controller, instead of reading log files, the monitoring module does not need to know particular log message text strings. The advantage is that if log message text changes in some minor way, the monitoring module will still function properly. Contrariwise, if a custom script is written and has been programmed in some way to check for specific text strings, then if those text strings change, e.g., due to changes in software, then said scripts may no longer be able to match log messages.

In another embodiment, a monitoring module could also be used to test for conformance to a network policy. To some extent, network policy checks (i.e., conformance to X) and error checks (i.e., non-conformance to X) are simply opposite ways to make the equivalent specification. So, all powers of logic rules for specifying patterns to identify errors could be used to specify patterns of conformance to a policy, in some cases simply by negating the rule. The argument is almost tautological, but an example would be:

Policy viewpoint: all users in the user list must have a home directory on the network file system.

Error check viewpoint: report an error if there exists any user in the user list that does not have a home directory on the network file system.

The embodiments utilize a centralized store of rules instead of ad-hoc scripts. The chief trouble with ad-hoc script based analysis is that the scripts are often purpose-built based on one problem occurrence or situation, and then are quickly forgotten. They are seldom updated unless the problem occurs frequently. Instead, in the process and system of the embodiments, all scripts are written in a uniform manner (e.g., using logic rules) and can be committed to a centralized repository, which facilitates keeping them up to date. Because the logic rules written for troubleshooting become integrated with the system, and they are written in a uniform way, they can be reused. If the table schemas of the network controller were to change, the scripts could be checked to see if they still match the new schema.

In one embodiment, the process is applied to a network with a centralized network controller such as a software defined networking (SDN) network having an SDN controller. However, one skilled in the art would understand that the process could be applied in any architecture where there is a controller with sufficient information about the network configuration and that implements a provisioning system. The provisioning, in the embodiments, can be specified using logic rules. If the network controller does not natively support or is not built around logic programming, but offers database application programming interfaces (APIs), such as those of a relational database or an object datastore exposed by a representational state (REST) interface, then the principles, process and structures described herein can still be used in a similar manner.

The basic operation of the process is to map a number of input rows from the database/tables of the network controller as tuples (aka relations or rows), which then can be matched against by logic programs. The logic programs can be written in any logic programming language but in an example embodiment the datalog language, or a close variant of the datalog language, which is a subset of the prolog language, can be used. The logic programming ruleset follows the pattern of horn clauses, which can be described such that in a horn clause, rule X is true if all of its predicates are true. A predicate is true if there is a pattern-based binding of free variables and variables bound in other predicates such that all predicates are true.

A simple example of a horn-clause based rule that can catch a problem in a network controller database would be:

Path_Untrusted(any_path):—path(any_path, node_a, node_b), link(any_path, some_link), link_untrusted (some_link).

In this case, a path is known to be untrusted if it contains any link that is untrusted. This rule can execute against the database of the network controller to flag security policy violations. This rule will collect the set of all Path_Untrusted tuples into the Path_Untrusted relation, which may be further queried by other rules, or may be reported to administrators. To permanently enable Warnings if any tuples are present in the Path_Untrusted relation, a declaration can be added by the administrator:

Warning (Path_Untrusted).

The embodiments can be implemented to function ether in an entirely automated method or interactively. If used in an entirely automated method, the embodiments might be used either in realtime (i.e., as events are received by a network controller), periodically, or interactively. In the last case, a command line shell interface can be provided to the user to type in logic rules, analyze results, and explore the state space of the controller. Rules can subsequently be saved for automatic use as previously described.

In some embodiments, the processes can be applied to network controllers which are already built atop logic rules. The data of such network controllers is additionally made accessible via a structured query language (SQL) interface to make querying easy, and the embodiments are capable of integrating with any database with either an SQL or a REST interface, so many types of network controllers or orchestration systems whose data is already stored in, or could be imported into, a database could in principle be accessed and monitored by the process and system.

As an additional feature of the embodiments, a means to annotate logic rules with expectations, so that divergences from those expectations are flagged as errors is provided. An example of such a logic rule defining an expectation may be:

Expectation $E1=(|\text{Routes(customer)}|<=|\text{Interface (router, intf)}, \text{Virtualrouter(customer, router)}|)$.

This expectation means that the total routes carried for a customer should not exceed the number of total router interfaces across all virtual routers assigned to that customer in the network managed by a network controller. The || notation is taken from set theory to mean "the count of" or "the number of elements in a set." Inside ||, either a relation can be specified or a number of rule predicates can be satisfied.

FIG. 1 is a flowchart of one embodiment of the overall process for automating network monitoring. The process begins with the writing of logic rules for each of the types of problems that are to be detected (Block 101). These logic rules, as described above, can be written using any suitable programming language for expressing logic rules such as datalog and variations thereof. This set of logic rules is programmed by a network administrator who thereby defines the expectations as well through annotation as described herein above via horn clauses or similar notation (Block 103).

The network is then provisioned to handle the data traffic of the network in line with network policies and similar considerations using standard networking configuration schemes (Block 105). The network can have any size, number of constituent network devices, protocols, technologies, topology or similar variations. The network can be an SDN network or similar network having a centralized controller or a set of controllers with centralized control and configuration over the network. A 'set,' as used herein, refers to any positive whole number of items including one item. With the network thus provisioned, the monitoring module can monitor the state of the network using the databases and tables maintained by the network controller to compare the data therein to the defined expectations, and where the data does not conform with expectations the monitoring module generates a notification to the network administrator (Block 107).

Figure 2:
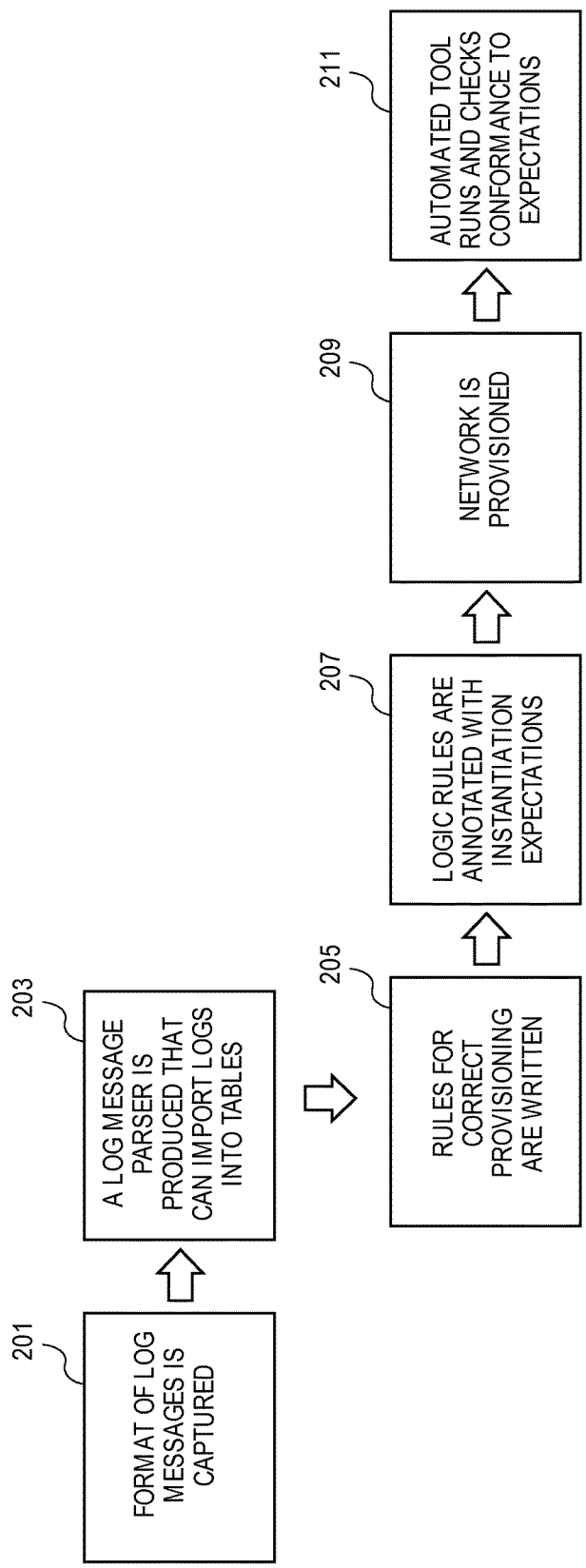
FIG. 2 is a flowchart of another embodiment of the overall process for automating network monitoring.

FIG. 2 is a flowchart of another embodiment of the overall process for automating network monitoring. In this embodiment, where additional information is imported into the system to be processed and monitored. In the prior embodiment of FIG. 1, the data being monitored is limited to network data collected by the network controller or that is provisioned by the network controller and accessible in the databases and tables of the network controller. In this embodiment of FIG. 2, the logs of the network controller are processed and made available to the monitoring module for assessment. The format of the logs are initially determined (Block 201). The logs can have various formats and the process examines the logs to determine the format of the data contained therein, by examination of the metadata of the logs, comparison of the entries in the log to known formats or through similar mechanisms. Once the format has been identified, then a log message parser capable of handling the identified format is executed to extract the data from the log messages such that they can be imported into databases or tables that can be accessed by the monitoring module and used to check for patterns and correlation to the defined logic rules and expectations (Block 203). A single log parser can be utilized that is able to parse differing types of logs or individual log parsers can be utilized where an appropriate log parser that handles the identified format is instantiated and executed.

Figure 3:
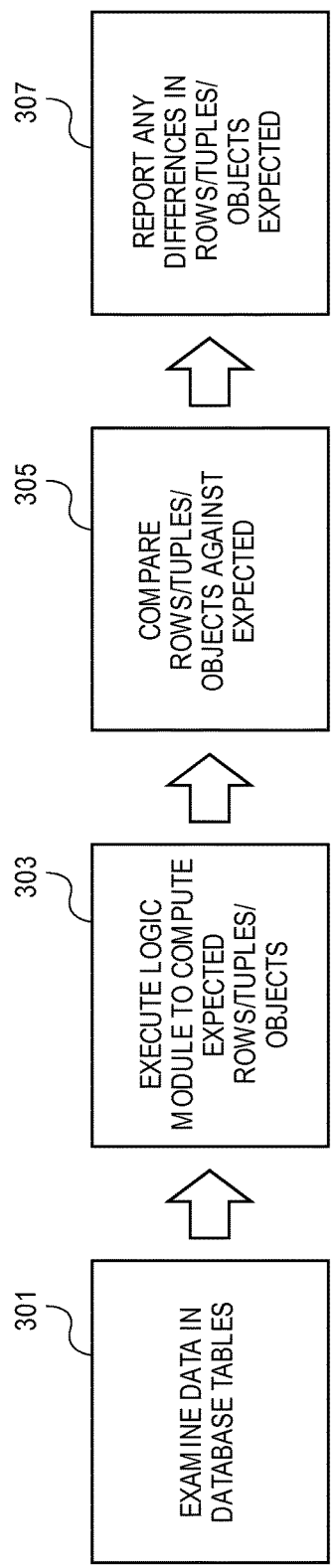
FIG. 3 is a flowchart of one embodiment of the operation of the monitoring module.

FIG. 3 is a flowchart of one embodiment of the operation of the monitoring module. The monitoring module can check the status of the state of the network in real-time as data is received, periodically at any interval, or in response to particular events in the network. The process examines data in the database tables (Block 301). Specific sets of fields or tuples are to be examined in this process to determine whether the network is in the state that is expected by the network administrations. The logic module executes to compute the set of expected fields to be examined by parsing the logic rules and expectations to determine which fields/rows/tuples/objects are correlated with the defined rules (Block 303). The values of these identified fields/rows/tuples/objects are retrieved and the retrieved values are compared to the expected values defined by or derived from the logic rules and expectations (Block 305). In some embodiments or cases, the comparison is an exact comparison of values to expected values, whereas in other embodiments or cases the comparison can involve a range of values or a degree of variance, or similar metric that allows some variance in values without considering the comparison a mismatch. For each mismatch of current network data with the expected values, a notification or report is generated identifying the difference, values, fields/rows/tuples/objects involved and similar information about the mismatch and the data involved, which is then sent to or made available to a network administrator through a user interface, message or similar mechanism (Block 307).

Figure 4:
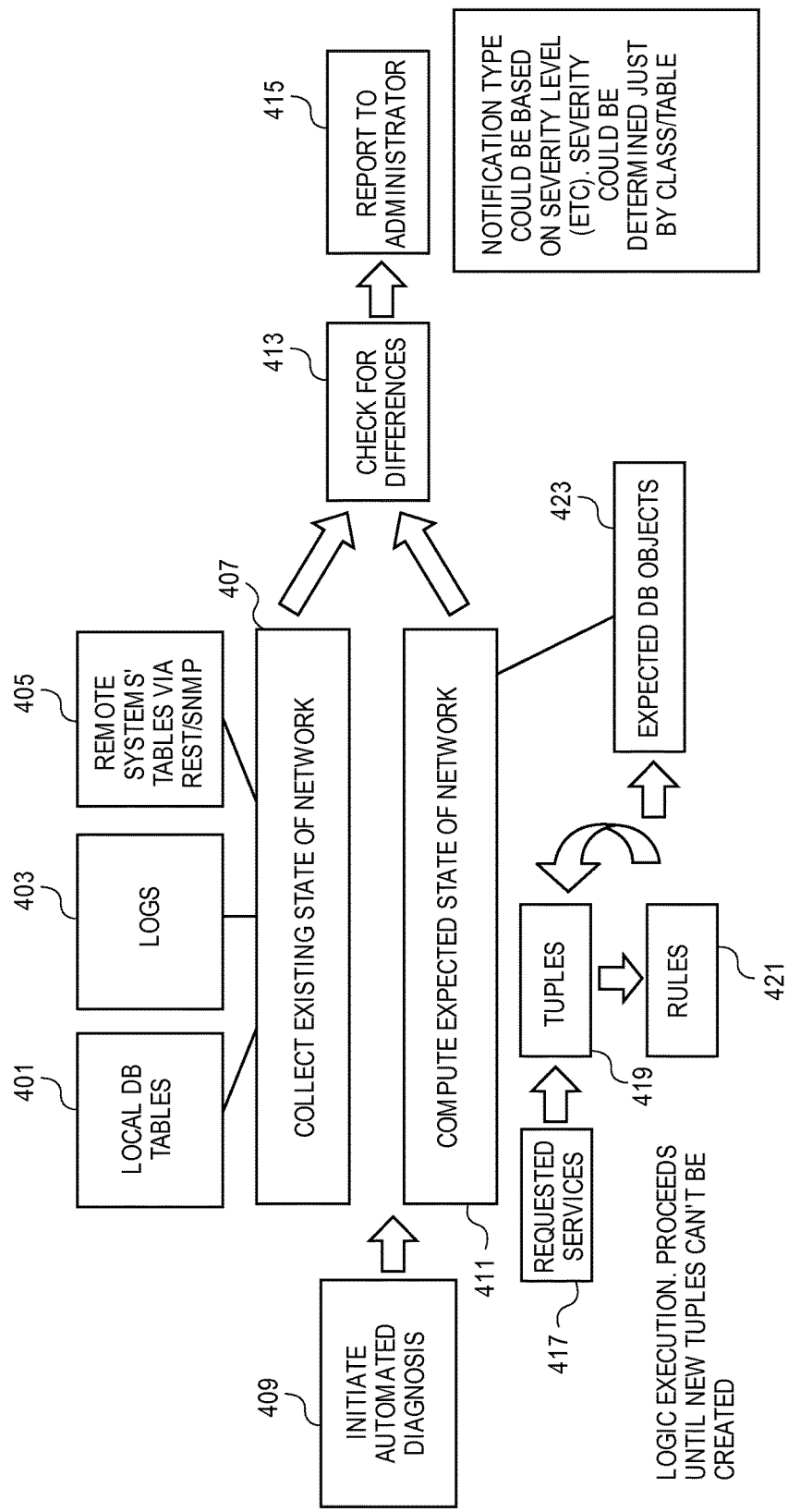
FIG. 4 is a diagram of one embodiment of a high level representation of the process and system.

FIG. 4 is a diagram of one embodiment of a high level representation of the process and system. The diagram shows the inter-relation of the stages of the process and the data structures involved in implementing this process. The data structures include local database tables 401, logs 403, and remote system databases 405. Local databases 401 can include network topology information, network policies, network metrics and similar information. The logs 403 include server software reporting information from the operating system, applications and similar programs being executed and playing a role in the operation of the network controller. The remote system databases 405 are accessible to the network controller and the components of the process and system via REST interface, simple network management protocol (SNMP) and include network device configuration information, network traffic metrics and similar information. This information is collected to determine the existing state of the network 407, which is in turn fed into the check for the differences between the expected network state and the actual network state 413 where mismatches result in reports to the network administrator 415. These notifications can vary in type based on the severity of the tables/rows/tuples/objects involved and their links to essential functions of the network, network controller or network devices.

The collection of the network state is initiated as part of the automated network diagnosis and monitoring process 409. To determine the expected state of the network, the process takes into consideration the set of requested services in the network or that are provided by the network controller 417. This can be in the form of defined logic rules, expectations, network policies or similar sources of defined operation of the network and network controller. This information is mapped to specific fields/rows/tuples/objects in the data structures of the network 419. The interplay between the specific fields/rows/tuples/objects is determined by the logic module which parses each rule 421 and expectation to identify the correlated fields/rows/tuples/objects in the available data structures and can output an expected state of the network in the form of expected database objects or values to be compared with the actual state of the network 423. As discussed above, this set of expectations 411 once identified are input into the check of differences 413 in the expectations and the actual or existing state of the network, which in turn generates reports and notifications 415 to the network administrator.

Figure 5:
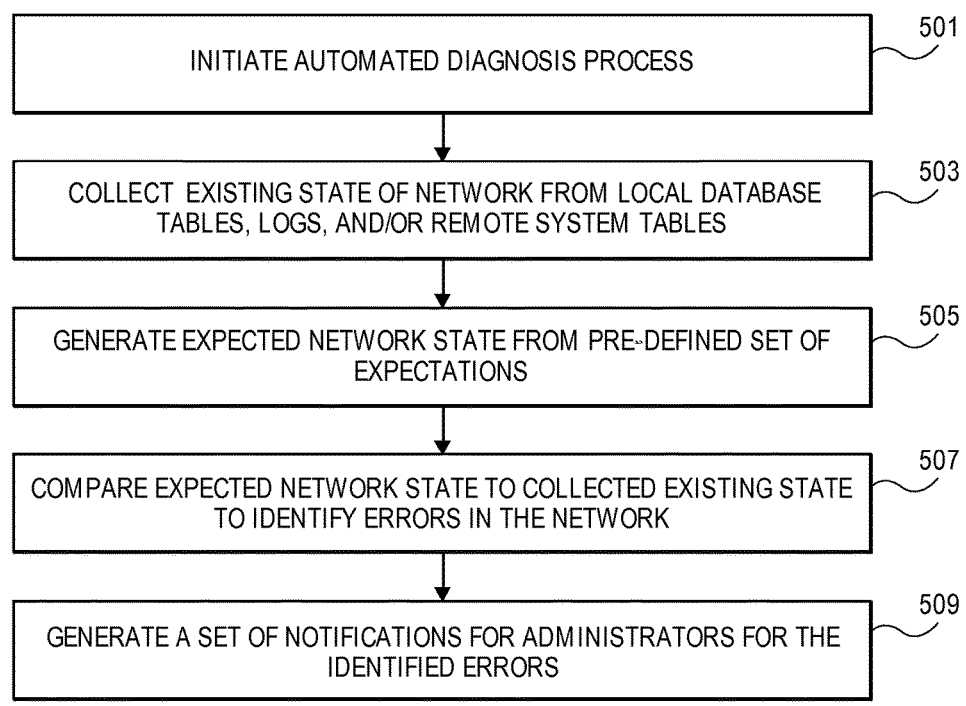
FIG. 5 is a flowchart of a basic process for the automated network monitoring process.

FIG. 5 is a flowchart of a basic process for the automated network monitoring process. The method related to the general structures and processes described above is illustrated. In one embodiment, the process is initiated as an automated diagnosis process (Block 501). The network controller begins collecting the existing state of the network from local data structures such as local databases, logs, and or remote system data structures (Block 503). This information can be collected or retrieved by a monitoring module or similar component. Possibly in parallel to this collection of the existing state of the network, a logic module determines the expected state of the network using an input set of logic rules, predefined expectations and similar information provided by a network administrator or derived from the input of the network administrator (Block 505). This process of collecting the existing state and the expected state can be done continuously in real-time, periodically at any interval or frequency (e.g., set by a network administrator), or in response to network events that are defined, e.g., by the network administrator or inherent in the system.

When the expected network state and the existing network state are collected or updated, then a comparison of the data can be carried out (Block 507). The parsing of the defined logic rules and the expectations defined for the system can identify the specific fields/rows/tuples/objects in data structures in the existing network information that are to be compared to the values of the expectations derived by the logic module. The comparison can result in a set of mismatches between the existing state of the network and the expected state of the network, which are then the basis for generating a set of notifications to the network administrator (Block 509). The type and format of the notifications can be based on the type or severity level associated with the mismatched field/row/tuple/object or with the logic rule or expectation that has been mismatched.

The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6:
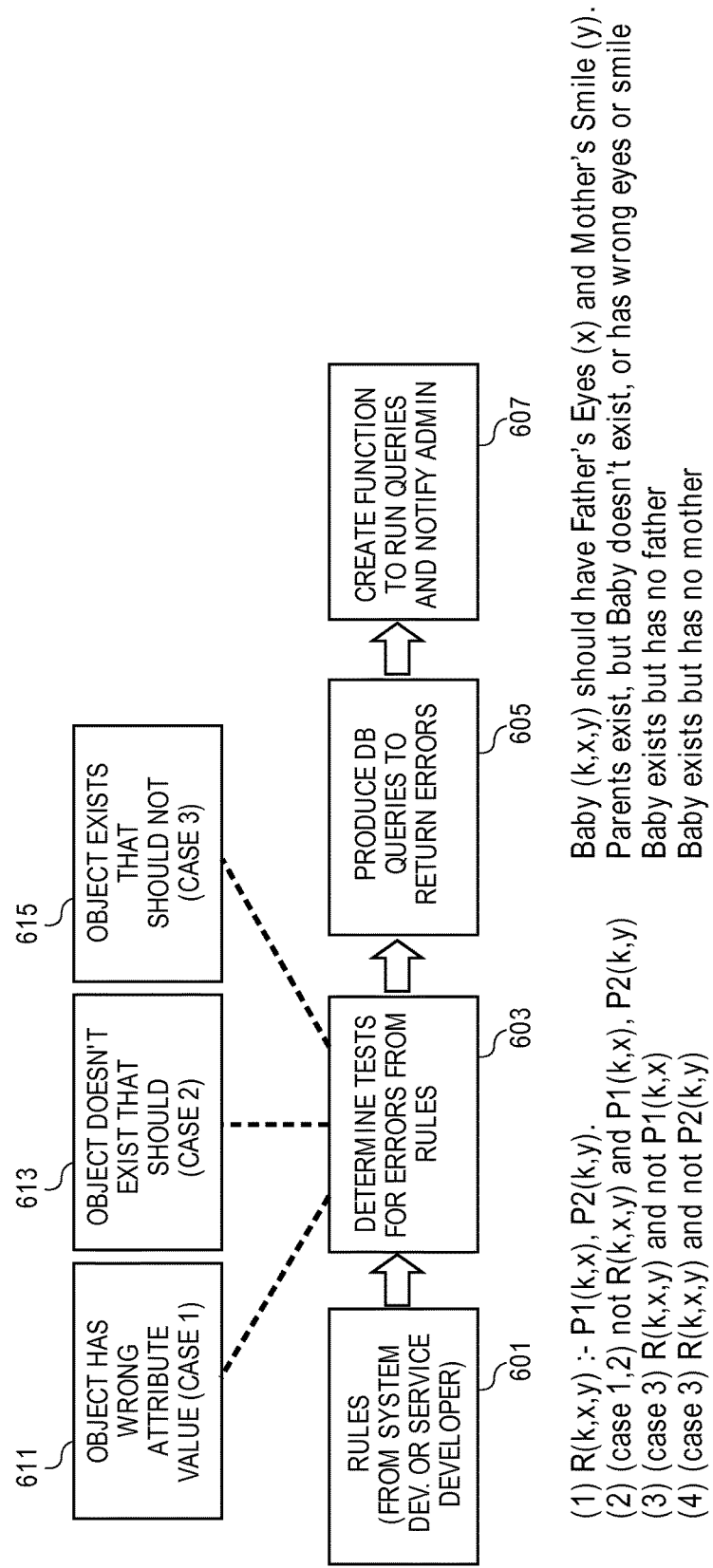
FIG. 6 is a diagram of one embodiment of the process for determining troubleshooting queries based on defined expectations.

FIG. 6 is a diagram of one embodiment of the process for determining troubleshooting queries based on defined expectations. The process is described in relation to a set of example rules and cases. The rule R(k, x, y):—P1(k, x), P2(k,y) indicates that the Rule is true where the predicates P1 and P2 are true and could be applied with an example, where baby (k, x, y) should have the eyes of its father (x) and smile of its mother (y). The rules are input into the system (Block 601) from an administrator, system developer, service developer or similar source.

The rules are processed by a logic module to determine a set of tests for errors from the rules, such as a set of established cases. These cases can include identifying that an object has a wrong value (case 1) 611, an object doesn't exist that should exist (case 2) 613, or an object exists that should not exist (case 3) 615. With the example rule described above, these cases can be expressed as not R(k, x, y) and P1(k, x), P2(k, y) for case 1 and case 2. For the given example, Parents exist, but Baby doesn't exist or has wrong eyes or smile. For case 3, R(k, x, y) and not P1(k, x), which could be applied as Baby exists but has no father. Also, for case 3, R(k, x, y) and not P2(k, y), which could be applied as Baby exists but has no mother. In other embodiments, example cases can include R(k, x',y) or R(k, x, y') and P1(k, x), P2(k,y), where the Baby exists but has the wrong eyes or wrong smile, a separate example of case 1, or a separate example of case 2 not R(k,x,y) and P1(k,x), P2(k,y), where the Parents exist, but Baby doesn't exist. In these examples, k is a unique identity of the baby and x and y are the expected characteristics whereas x' and y' are the expected characteristics having different values, i.e., x !=x' and y !=y'. These example applications of the cases are not intended to be exhaustive and one skilled in the art would understand that other combinations and applications of the cases are possible.

With the cases generated for the rules by applying templates for the cases, a set of queries to the data base are generated to obtain the requisite data 605. For each of the values correlated with the cases, a query to obtain these values associated with the cases is generated. Then a set of functions are scheduled to execute each of the queries, the queries can be executed and the results can be compared and where mismatches are found, then notifications to the network administrator can be generated 607.

Figure 7:
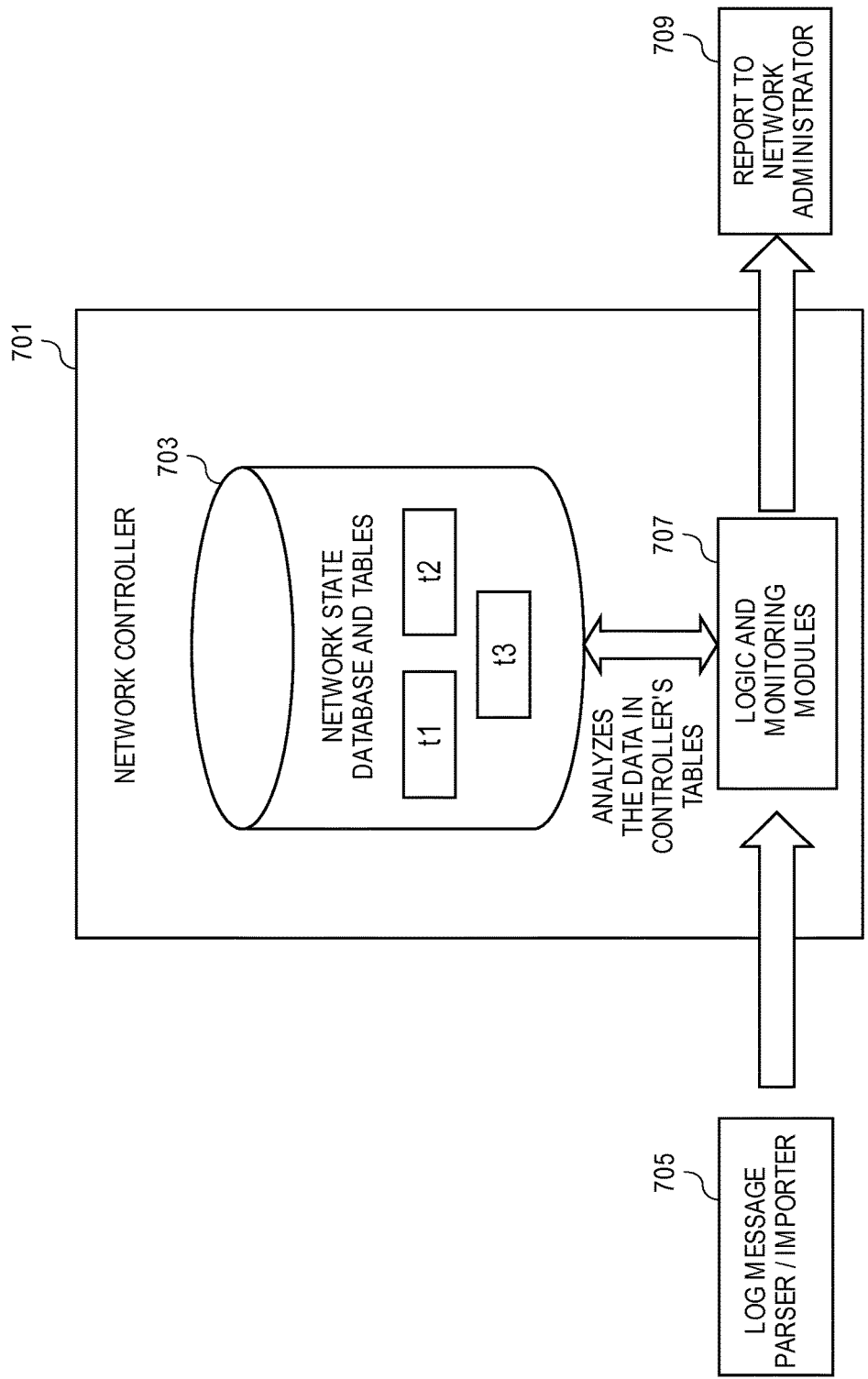
FIG. 7 is a diagram of one embodiment of the logic and monitoring modules of the embodiments.

FIG. 7 is a diagram of one embodiment of the logic and monitoring modules of the embodiments. The system diagram of usage is shown. In this illustrated embodiment another feature that is necessary for interfacing with generic logging systems that are not themselves structured as databases is disclosed. In that case, log message data must be imported into a database. For that, a log conversion function must be generated based on log message descriptions that will create a database and populate it with the contents of each log message. For that the embodiments offer a method and system for monitoring an existing state of the network against an expected state of the network.

In the diagram, the network controller 701 includes a network state database and tables 703. The network controller 701 can be any type of computing device and can be responsible for configuring and operating any type of network such as an SDN network. Any number and organization of tables can be present in the database 703. The tables and databases can be accessible via any type of interface or via any database management system. The logic and monitoring modules 707 can access the network state and database and tables to obtain the information needed for determining the existing state of the network. In some embodiments, the log message parser/importer 705 or similar component processes log information and provides it as an additional source of network state to the logic and monitoring modules 707. The logic and monitoring module 707 can identify discrepancies between the existing network state and the expected network state and generate reports or other notifications for network administrators 709 via a user interface or similar mechanism.

Figure 8:
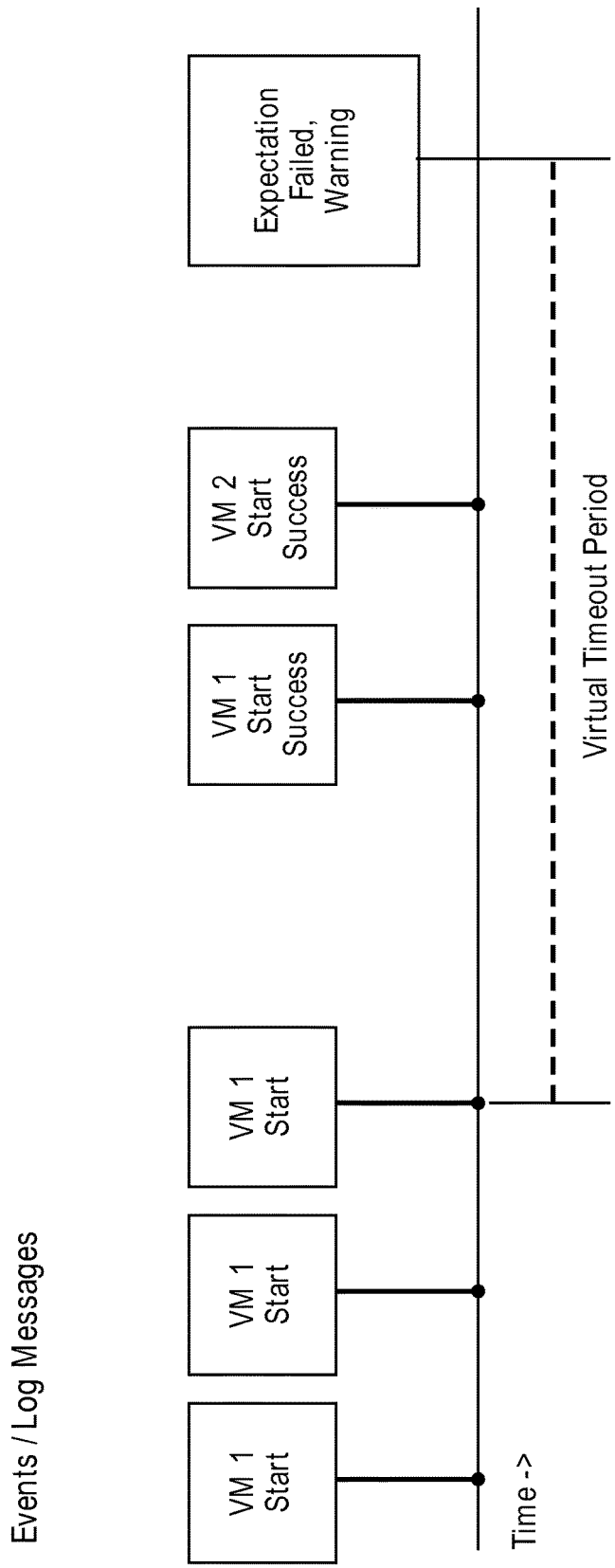
FIG. 8 is a diagram of one embodiment of a process for handling events or log entries.

FIG. 8 is a diagram of one embodiment of a process for handling events or log entries. In one embodiment, once in the database, rules as described above are run at defined intervals, for example at a set of virtual timesteps of the logged devices, i.e., log messages are added one by one and rules are examined/executed such that any warnings produced for that point in time can be reported. This is similar in principle to discrete event simulation; the term virtual timestep is only used to distinguish it from real ("wall clock") time. Some types of warnings (the errors of omission as described previously) cannot be determined until the log file is known to be finished. For example, if the absence of a billing record after a virtual machine (VM) is created would be a problem, the process would only know of the absence of a billing record by failing to see a log message indicating the start of billing; to that end, the process should know how long to wait. For that problem the embodiments may utilize a virtual timeout.

As illustrated in reference to FIG. 8, a virtual timeout is a type of rule that considers something to be missing if it is expected at some point in time but never materializes. For example, a request to start up a virtual machine image may take a great number of seconds to complete. If the computer that is starting up the virtual machine were to itself lose power, no completion or failure message might actually appear in any system log. Because of this, there is nothing particular in the log to search for to determine if the VM start success notification message is absent. This is the problem that virtual time solves. Virtual timeout is an expectation with a timeout value.

Expectation $E2 = (|VM\_Start(vm, vm\_request)| = |VM\_Start\_Success(vm)|)$

Timeout E2 3600.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 9A:
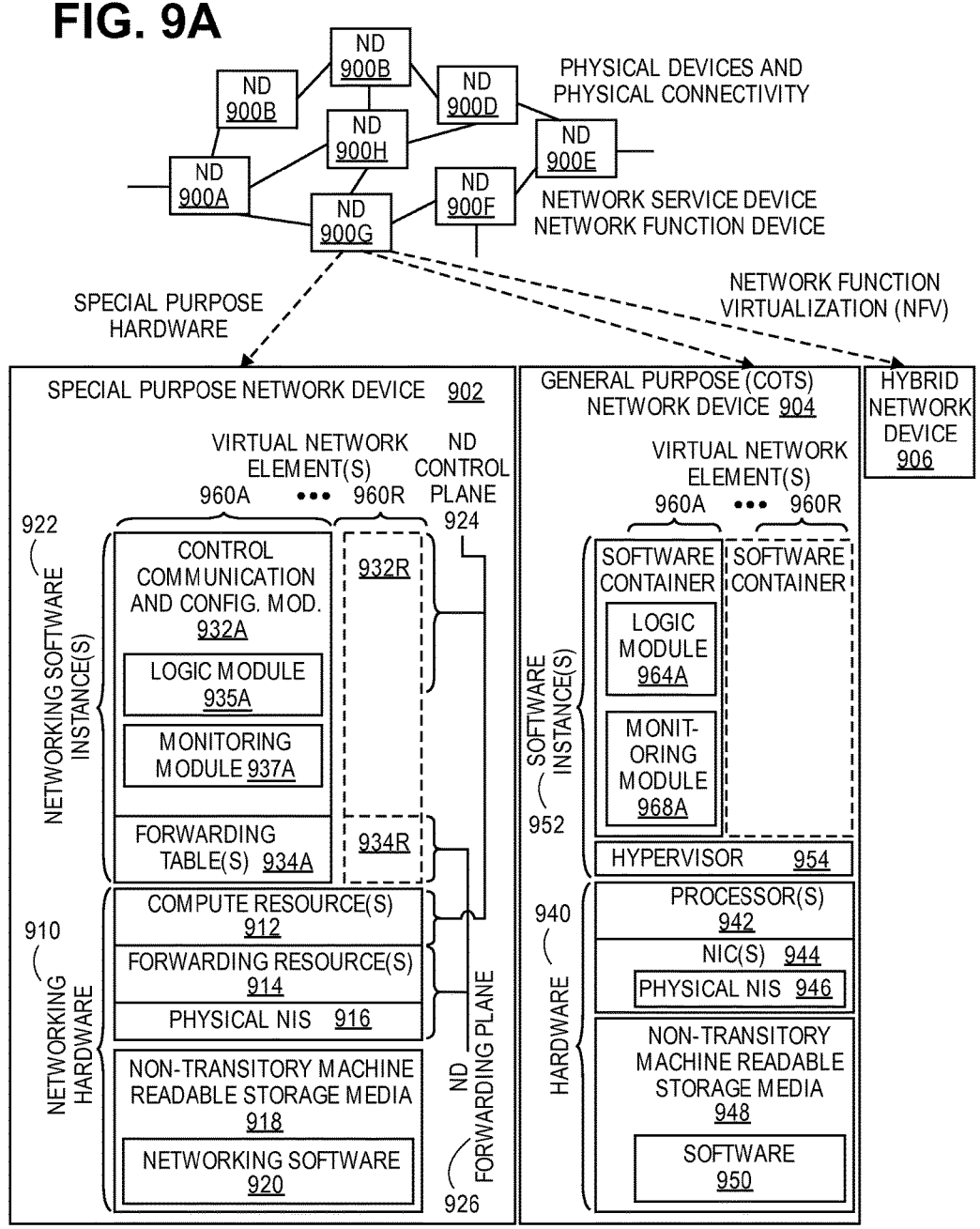
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Software 920 can include code which when executed by networking hardware 910, causes networking hardware 910 to perform operations of one or more embodiments of the present invention as part networking software instances 922. The embodiments can include the execution of the logic module 935A and monitoring module 937A, which implement the functions described herein above. These components can be implemented as separate software modules, encompass additional software modules, can be integrated, or any combination thereof.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
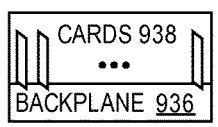
FIG. 9B illustrates an exemplary way to implement a special-purpose network device according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications or programs such as logic modules 964A-R and monitoring modules 688A-R. While one embodiment does not implement virtualization, alternative embodiments may use different forms of virtualization-represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 962A-R differently. For example, while embodiments of the invention are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

Software 950 can include code which when executed by processor(s) 942, cause processor(s) 942 to perform operations of one or more embodiments of the present invention as part software containers 962A-R. This can include the implementation of logic modules 964A and monitoring modules 968A by virtual machines 960A that can be part of a NFV or local implementation of the functions described herein above. The functions can be distributed over any number of virtual network elements 960A-R.

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 9C:
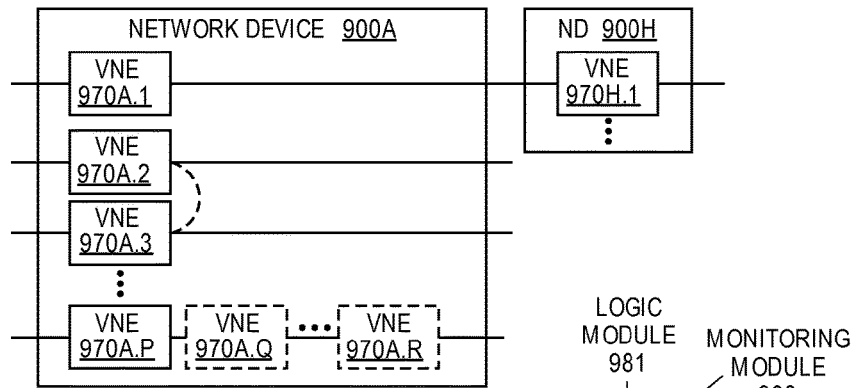
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 9D:
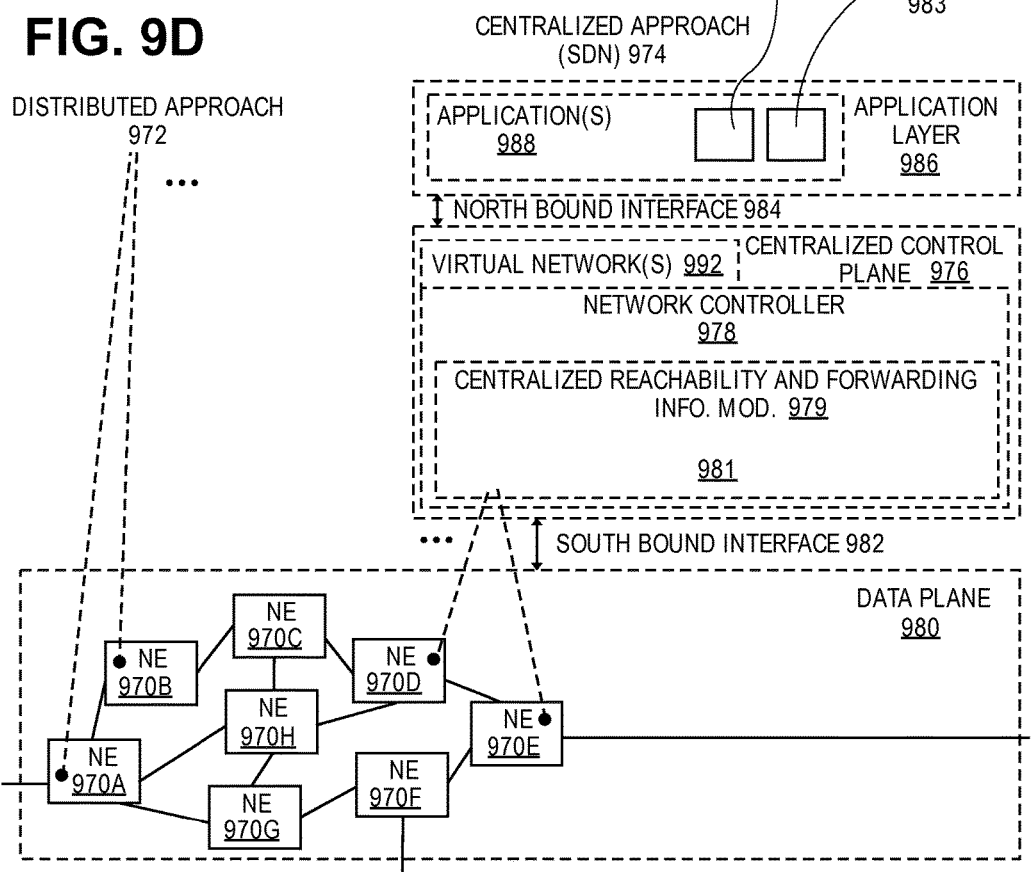
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the applications 988 include the logic module 981 and monitoring module 983 to implement the functions described herein above at the centralized control plane 976 rather than at the network element.

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
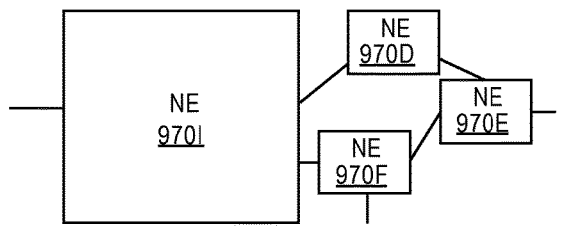
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
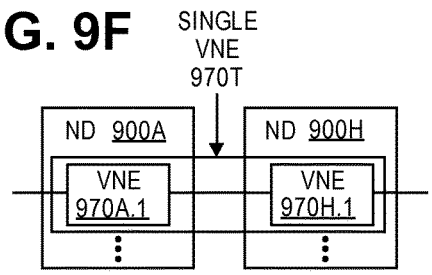
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
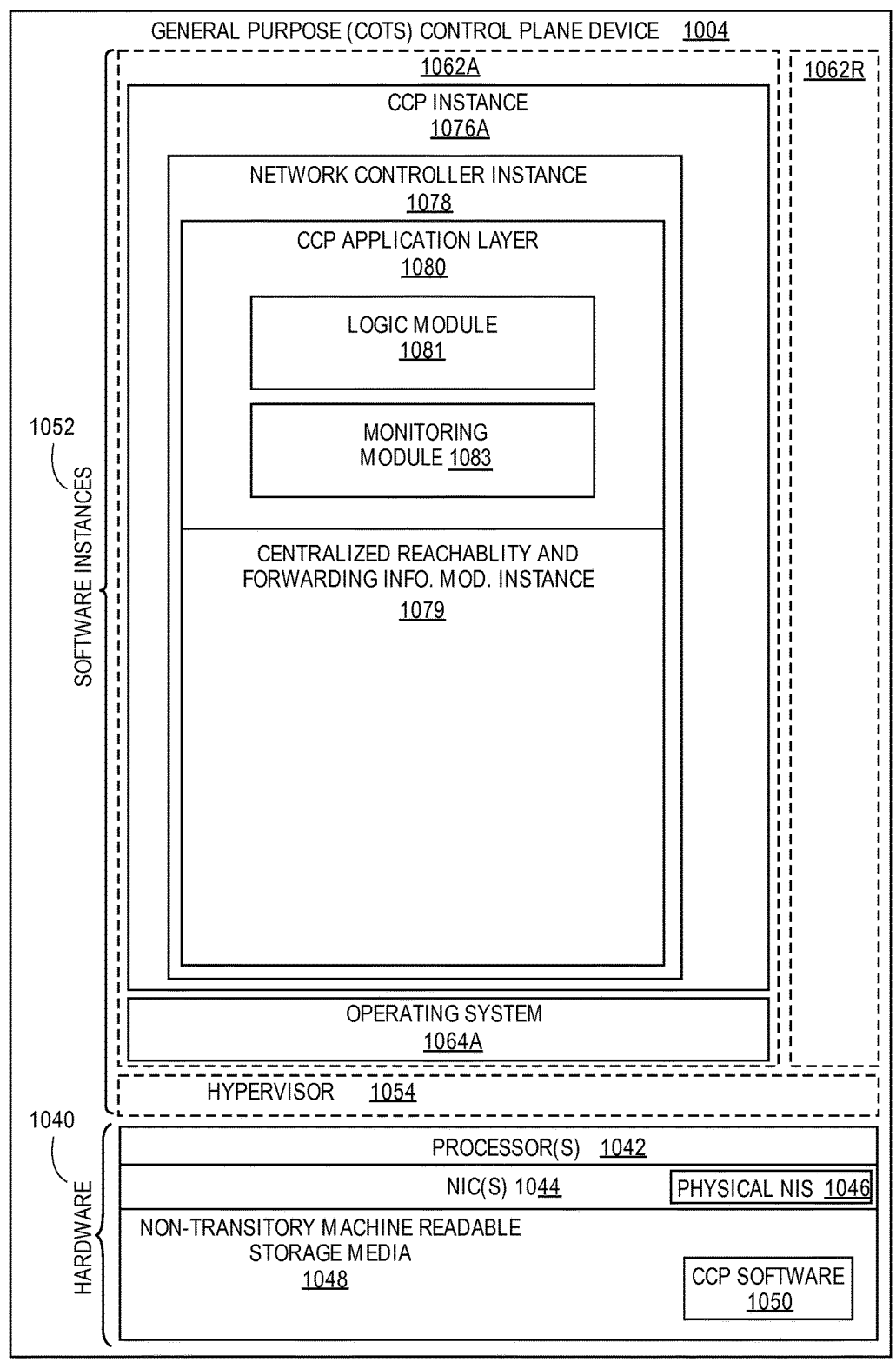
FIG. 10 illustrates a general purpose control plane device with centralized control plane (CCP) software, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In embodiments that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1050 (illustrated as CCP instance 1076A) is executed within the software container 1062A on the virtualization layer 1054. In embodiments where compute virtualization is not used, the CCP instance 1076A on top of a host operating system is executed on the "bare metal" general purpose control plane device 1004. The instantiation of the CCP instance 1076A, as well as the virtualization layer 1054 and software containers 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view. In some embodiments, the logic module 1081 and monitoring module 1083 are implemented in the control plane at the CCP application layer 1080.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a computing device to automate management functions in a network, the method comprising:
   collecting an existing state of the network from local database tables, logs or remote system tables;
   generating an expected network state from a predefined set of expectations, wherein the expected network state is expressed as a set of logic rules that describe stateful and recursive functions to detect patterns in the database tables, logs or remote system tables that indicate specific network problems;
   comparing the expected network state to the collected existing state to identify errors in the network; and
   generating a set of notifications for administrators for the identified errors.

2. The method of claim 1, further comprising:
   storing the collected existing state of the network in a network state database; and
   mapping expectations to a set of rows, fields, tuples or objects in a network state database.

3. The method of claim 1, further comprising:
   converting a rule or expectation into at least one of a set of predefined cases; and
   applying the at least one of the set of predefined cases as the expected network state to the collected existing state.

4. The method of claim 1, where the comparing the expected network state is performed over a set of virtual timesteps and wherein an error is identified when a virtual timeout expires.

5. A network device in a network including a plurality of network devices, the network device configured to implement a method to automate management functions in a network, the network device comprising:
   a non-transitory machine readable medium, having stored therein a logic module and a monitoring module; and
   a processor coupled to the non-transitory machine readable medium, the processor configured to execute the logic module and the monitoring module, the logic module configured to generate an expected network state from a predefined set of expectations, wherein the expected network state is expressed as a set of logic rules that describe stateful and recursive functions to detect patterns in the database tables, logs or remote system tables that indicate specific network problems, the monitoring module configured to collect an existing state of the network from local database tables, logs or remote system tables, to compare the expected network state to the collected existing state to identify errors in the network, and to generate a set of notifications for administrators for the identified errors.

6. The network device of claim 5, wherein the logic module is further configured to store the collected existing state of the network in a network state database, and to map expectations to a set of rows, fields, tuples or objects in a network state database.

7. The network device of claim 5, wherein the logic module is further configured to convert a rule or expectation into at least one of a set of predefined cases, and to apply the at least one of the set of predefined cases as the expected network state to the collected existing state.

8. The network device of claim 5, where the comparing the expected network state is performed over a set of virtual timesteps and wherein an error is identified when a virtual timeout expires.

9. A computing device in communication with a network device in a network including a plurality of network devices, the computing device configured to execute a plurality of virtual machines for implementing network function virtualization (NFV), wherein a virtual machine from the plurality of virtual machines is configured to implement a method to automate management functions in a network, the computing device comprising:
   a non-transitory machine readable medium, having stored therein a logic module and a monitoring module; and
   a processor coupled to the non-transitory machine readable medium, the processor configured to execute the virtual machine, the virtual machine configured to execute the logic module and the monitoring module, the logic module configured to generate an expected network state from a predefined set of expectations, wherein the expected network state is expressed as a set of logic rules that describe stateful and recursive functions to detect patterns in the database tables, logs or remote system tables that indicate specific network problems, the monitoring module configured to collect an existing state of the network from local database tables, logs or remote system tables, to compare the expected network state to the collected existing state to identify errors in the network, and to generate a set of notifications for administrators for the identified errors.

10. The computing device of claim 9, wherein the logic module is further configured to store the collected existing state of the network in a network state database, and to map expectations to a set of rows, fields, tuples or objects in a network state database.

11. The computing device of claim 9, wherein the logic module is further configured to convert a rule or expectation into at least one of a set of predefined cases, and to apply the at least one of the set of predefined cases as the expected network state to the collected existing state.

12. The computing device of claim 9, where the comparing the expected network state is performed over a set of virtual timesteps and wherein an error is identified when a virtual timeout expires.

13. A control plane device configured to implement a control plane of a software defined network (SDN) network, the SDN network including a plurality of network devices, the control plane device configured to implement a method to automate management functions in a network, the control plane device comprising:
a non-transitory machine readable medium, having stored therein a logic module and a monitoring module; and
a processor coupled to the non-transitory machine readable medium, the processor configured to execute the logic module and the monitoring module, the logic module configured to generate an expected network state from a predefined set of expectations, wherein the expected network state is expressed as a set of logic rules that describe stateful and recursive functions to detect patterns in the database tables, logs or remote system tables that indicate specific network problems, the monitoring module configured to collect an existing state of the network from local database tables, logs or remote system tables, to compare the expected network state to the collected existing state to identify errors in the network, and to generate a set of notifications for administrators for the identified errors.

14. The control plane device of claim 13, wherein the logic module is further configured to store the collected existing state of the network in a network state database, and to map expectations to a set of rows, fields, tuples or objects in a network state database.

15. The control plane device of claim 13, wherein the logic module is further configured to convert a rule or expectation into at least one of a set of predefined cases, and to apply the at least one of the set of predefined cases as the expected network state to the collected existing state.

16. The control plane device of claim 13, where the comparing the expected network state is performed over a set of virtual timesteps and wherein an error is identified when a virtual timeout expires.

\* \* \* \* \*